Nov. 15, 1932.  H. ELMIGER  1,887,923
PROCESS OF MANUFACTURING CORRUGATED PLASTIC BOARD
Filed Oct. 18, 1930
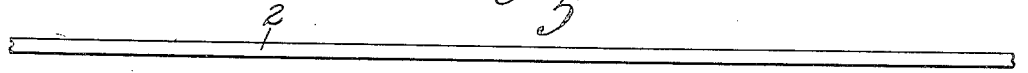
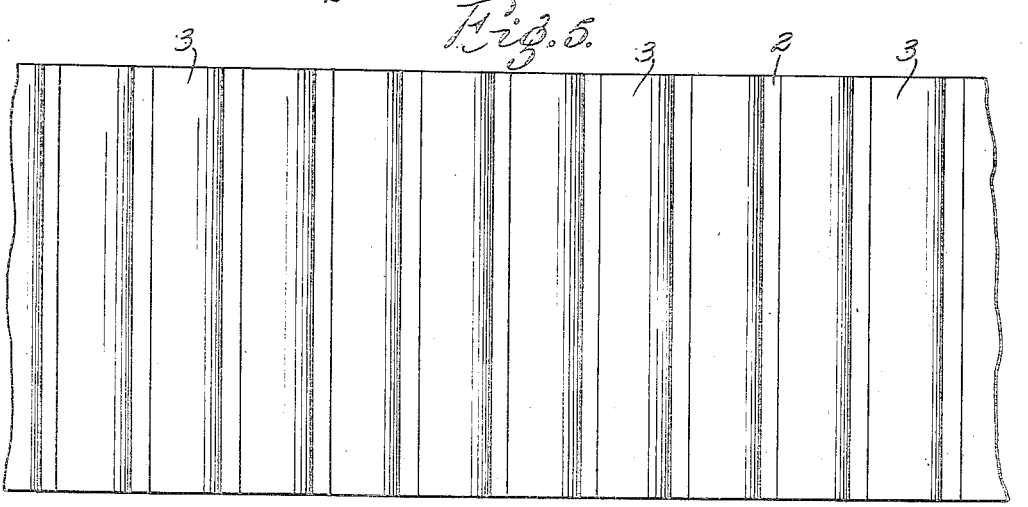
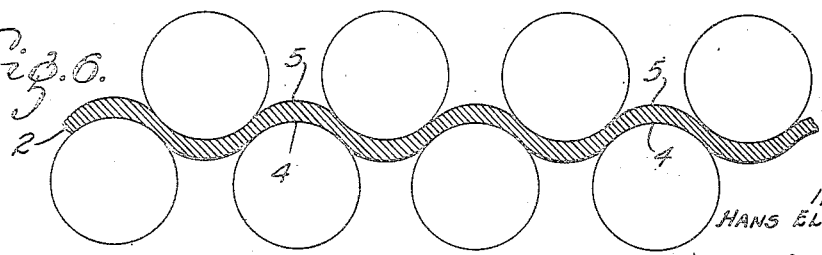
INVENTOR
HANS ELMIGER.
BY
ATTORNEY.

Patented Nov. 15, 1932

1,887,923

UNITED STATES PATENT OFFICE

HANS ELMIGER, OF ST. LOUIS, MISSOURI

PROCESS OF MANUFACTURING CORRUGATED PLASTIC BOARD

Application filed October 18, 1930. Serial No. 489,544.

This invention relates to a method of manufacturing corrugated plastic board.

The object of this invention is to produce a corrugated plastic board which when one board is superimposed upon another the surfaces will contact at every point.

The process and objects of the invention will be more clearly understood from an examination of the description, claim and drawing, in which:

Fig. 1 represents two corrugated sheets, one superimposed upon the other, embodying my invention.

Fig. 2 represents two corrugated sheets of plastic board made by one of the methods now in use.

Fig. 3 shows the edge of a plastic board of uniform thickness at all points.

Fig. 4 shows the edge of a plastic sheet made according to my process before being corrugated.

Fig. 5 is a plan view of a plastic sheet embodying my improvement.

Fig. 6 shows a sheet, embodying my invention, passing through the corrugating rolls.

In the manufacture of certain types of corrugated roofing and siding, but more especially in roofing, where one sheet is superimposed on another sheet in the form of shingles, in order to prevent fine snow and rain from being driven between the sheets when placed in position on a roof, it is necessary that the top sheet fit close and snug over the sheet below.

It has been found by practice that when a sheet fabricated, for instances of asbestos and cement, is passed through corrugating rolls, the plasticity of the sheet readily yields to the pressure of the corrugating rolls, so that when the sheet is completed the concavity of the upper sheet has a different radius from the convexity of the lower sheet, so that when applied to a roof, in the manner that shingles or boards are applied, an opening 1 remains between the sheets, clearly shown in Fig. 2. The reason this occurs is, as above referred to, because the sheet is stretched while passing through the corrugating rolls.

The sheet 2, shown in Fig. 2, is made from the sheet shown in Fig. 3. By experimentation it has been found that by building up the sheet 2 of uniform thickness as shown in Fig. 3 and providing parallel lateral ridges 3 transversely disposed at regular intervals, as shown in Fig. 4, stretching of the sheet during the process of corrugation forms a sheet which when superimposed on another, each sheet contacts with the other at every point, the additional material of which the ridges are built up exactly compensating for the stretching caused by the sheet passing through the corrugating rolls.

The exact purpose of this invention is to provide a plastic sheet which when corrugated, the radius of the internal curve will be exactly the same as the radius of the external curve, that is to say, the internal curve 4 shown in Fig. 1 has the same radius as the external curve 5. In other words, the concave curve has the same radius as the convex curve, so that when the two sheets are placed one on the other, as shown in Fig. 1, they will lie pari passu throughout, making a joint so closely fitted that fine snow and rain cannot be driven between them.

It is obvious that at least two methods of producing suitable sheeting could be used. Either the plastic material can be rolled out at a uniform thickness as shown in Fig. 3 and then additional material deposited on the sheet to form ridges 3, or a system of rolls could be provided, the upper roll being fluted and the lower roll being a plane-faced roll. In either event, this invention consists in building up parallel, transverse ridges on top of an otherwise plain sheet of material.

It is further apparent that the distance from the apex of one ridge to the apex of the next adjacent ridge must be proportional to the size of the corrugations to be made; and it is obvious that in order for two corrugated sheets of considerable thickness to lie close and fit at every point with the sheet on which they are superimposed, it is necessary that the external radius and internal radius be the same.

Many attempts have been made to utilize corrugated plastic sheets for roofing purposes and many of these products are now upon the market, but in all cases, so far as the applicant is aware, they are objectionable for the reasons above set forth and shown in Fig. 2, and they are not weatherproof. It is, therefore, the purpose of this invention to correct these defects.

While the use of plastic corrugated sheets have been above referred to as suitable for roofing or siding, it is, of course, understood that sheets made by the process herein described and claimed may be used for a great variety of purposes; hence applicant does not wish to confine himself as to the uses to which boards made by this process may be applied, but intends to claim any use which may be found for such sheets.

It should be understood that plastic sheets are of much greater thickness than corrugated iron sheets, and it is because of this increased thickness of the plastic sheets that a new and different process or method of construction is required.

Having fully described this invention, what I claim as new and useful and desire to protect by Letters Patent is:

An improved process of manufacturing plastic corrugated sheets, which consists of preparing a sheet of any suitable plastic material, one side of which has a plain, flat surface and the opposite side provided with lateral parallel ridges spaced apart at equal distances from the apex of one ridge to the next adjacent ridge, said ridges being of equal heighth from a sheet of uniform thickness between said ridges and beneath said ridges, then corrugating said prepared sheet so that the radii of the inner curves of said corrugated sheets will be equal to the radii of the external and opposite curves of said corrugated sheets, so that when one sheet is superimposed on another the curved portions of one sheet will fit and contact at all points with the curves of the other sheet.

In testimony whereof I have hereunto affixed my signature this 3rd day of October, 1930.

HANS ELMIGER.